United States Patent
Kite et al.

(10) Patent No.: US 11,669,681 B2
(45) Date of Patent: Jun. 6, 2023

(54) AUTOMATED CALCULATION PREDICTIONS WITH EXPLANATIONS

(71) Applicant: HRB Innovations, Inc., Las Vegas, NV (US)

(72) Inventors: Benjamin A. Kite, Lawrence, KS (US); Jason N. Ward, Lee's Summit, MO (US); Zhi Zheng, Lawrence, KS (US)

(73) Assignee: HRB Innovations, Inc., Las Vegas, NV (US)

( * ) Notice: Subject to any disclaimer, the term of this patent is extended or adjusted under 35 U.S.C. 154(b) by 0 days.

(21) Appl. No.: 17/394,220

(22) Filed: Aug. 4, 2021

(65) Prior Publication Data
US 2023/0045574 A1 Feb. 9, 2023

(51) Int. Cl.
*G06F 17/00* (2019.01)
*G06F 40/205* (2020.01)
*G06F 40/40* (2020.01)
*G06N 3/02* (2006.01)
*G06F 40/174* (2020.01)

(52) U.S. Cl.
CPC .......... *G06F 40/205* (2020.01); *G06F 40/174* (2020.01); *G06F 40/40* (2020.01); *G06N 3/02* (2013.01)

(58) Field of Classification Search
CPC ...... G06F 40/205; G06F 40/174; G06F 40/40; G06N 3/02
See application file for complete search history.

(56) References Cited

U.S. PATENT DOCUMENTS

| | | | |
|---|---|---|---|
| 2017/0213294 A1* | 7/2017 | Cabrera | G06Q 40/123 |
| 2019/0197121 A1* | 6/2019 | Jeon | G10L 25/51 |
| 2020/0193527 A1* | 6/2020 | Hanekamp, Jr. | G06Q 40/123 |
| 2020/0402058 A1* | 12/2020 | Zhou | G06F 9/542 |

OTHER PUBLICATIONS

Liu, Hui, Qingyu Yin, and William Yang Wang. "Towards explainable NLP: A generative explanation framework for text classification." arXiv preprint arXiv:1811.00196 (2018) (Year: 2018).*

(Continued)

*Primary Examiner* — Andrew T McIntosh
(74) *Attorney, Agent, or Firm* — Erise IP, P.A.

(57) ABSTRACT

Media, methods, and systems are disclosed for automatically calculating predicted values using deep learning models. One or more input forms having a plurality of input form field values are received. The input form field values are automatically parsed into a set of computer-generated candidate standard field values. The set of candidate standard field values are automatically normalized into a data frame having a set of normalized field values. In response to determining which portions of the data frame to apply to a line calculation neural network, a corresponding line calculation neural network is applied. At least one output form line calculation is performed. A natural language explanation regarding the at least one output form line calculation is generated. Additional user provided inputs are received in response to the natural language explanation, and at least one remaining calculation is carried out based on the one or more additional user provided inputs.

20 Claims, 5 Drawing Sheets

(56) References Cited

OTHER PUBLICATIONS

Young, Tom, et al. "Recent trends in deep learning based natural language processing." ieee Computational intelligenCe magazine 13.3 (2018): 55-75 (Year: 2018).*

Ehsan, Upol, et al. "Rationalization: A neural machine translation approach to generating natural language explanations." Proceedings of the 2018 AAAI/ACM Conference on AI, Ethics, and Society. 2018 (Year: 2018).*

* cited by examiner

AUTOMATED CALCULATION PREDICTIONS WITH EXPLANATIONS

BACKGROUND

1. Field

Embodiments of the invention generally relate to systems for automating tax-form line calculations and, more particularly, to the automated calculation of predicted values using deep learning models and specially trained artificial neural networks to make predictions regarding accurate tax-form line calculations and provide associated natural language explanations.

2. Related Art

The process of preparing a tax return is notoriously complex and error prone. The complexity of the tax code means that simple questions can be surprisingly difficult to answer correctly. Furthermore, some questions have answers which are superficially correct, but which can result in errors in the return being prepared or in a smaller refund than the taxpayer would otherwise be entitled to.

To ensure correct returns and minimize tax liability for their users, makers of tax preparation systems seek provide automated tax-form line calculations so that significant portions (if not all) of a tax return can be automatically computed based on a taxpayer's input forms. Moreover, a user of tax preparation software has a need to understand the basis on which a particular tax-form line is calculated. Accordingly, there is a need for tax return preparation systems that can automatically calculate significant portions of a tax return while providing cogent explanations regarding how the calculations were performed.

SUMMARY

Embodiments of the invention address the above-identified problems by providing a mechanism for automatically calculating predicted tax-form line values using deep learning models and specially trained artificial neural networks to make the predicted calculations as well as providing associated explanations.

In particular, in a first embodiment, the invention includes one or more non-transitory computer-readable media storing computer-executable instructions that, when executed by a processor, perform a method for automated calculation of predicted values using deep learning models, the method comprising: receiving one or more input forms, each of the one or more input forms comprising a plurality of input form field values, automatically parsing the plurality of input form field values into a set of computer-generated candidate standard field values, automatically normalizing the set of candidate standard field values into a data frame comprising a corresponding set of normalized field values, based on a computer-automated input normalization model, in response to determining which portions of the data frame to apply to a line calculation neural network, applying the line calculation neural network, performing at least one output form line calculation, generating a natural language explanation regarding the at least one output form line calculation, receiving, from a user, one or more additional user provided inputs in response to the natural language explanation, and calculating at least one remaining calculation based on the one or more additional user provided inputs.

In a second embodiment, the invention includes a method for automated calculation of predicted values using deep learning models, the method comprising: receiving one or more input forms, each of the one or more input forms comprising a plurality of input form field values, automatically parsing the plurality of input form field values into a set of computer-generated candidate standard field values, automatically normalizing the set of candidate standard field values into a data frame comprising a corresponding set of normalized field values, based on a computer-automated input normalization model, in response to determining which portions of the data frame to apply to a line calculation neural network, applying the line calculation neural network, performing at least one output form line calculation, generating a natural language explanation regarding the at least one output form line calculation, receiving, from a user, one or more additional user provided inputs in response to the natural language explanation, and calculating at least one remaining calculation based on the one or more additional user provided inputs.

In a third embodiment, the invention includes a system comprising at least one processor and at least one non-transitory memory storing computer executable instructions that when executed by the processor cause the system to carry out actions comprising: receiving one or more input forms, each of the one or more input forms comprising a plurality of input form field values, automatically parsing the plurality of input form field values into a set of computer-generated candidate standard field values, automatically normalizing the set of candidate standard field values into a data frame comprising a corresponding set of normalized field values, based on a computer-automated input normalization model, in response to determining which portions of the data frame to apply to a line calculation neural network, applying the line calculation neural network, performing at least one output form line calculation, generating a natural language explanation regarding the at least one output form line calculation, receiving, from a user, one or more additional user provided inputs in response to the natural language explanation, and calculating at least one remaining calculation based on the one or more additional user provided inputs.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
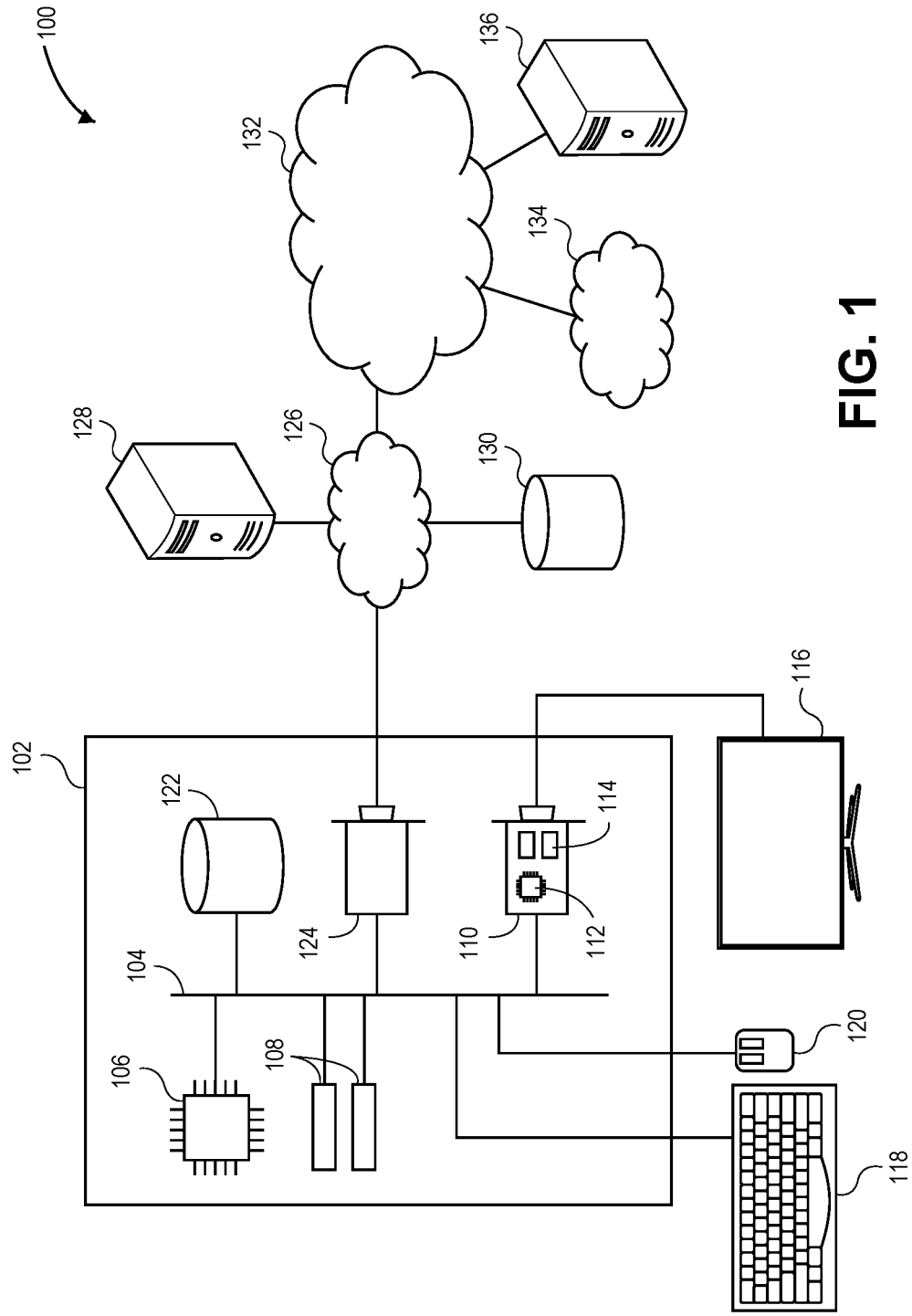
FIG. 1 depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

In various embodiments, a deep-learning approach is provided to automatically synthesize and apply tax-return structure to client data. Systems consistent with the present teachings allow for a tax return to be compared across various return computation scenarios with different tax information, thereby learning how various tax input data relates to output created from various tax preparation sources. In some embodiments, deep-learning models receive inputs and predict outputs. Further machine-learning models employ reinforcement learning to internalize machine-learning rules that accurately simulate actual tax rules. In some embodiments, automated calculation prediction models operate in connection with a tax return review system that identifies anomalies in proposed calculations or actual tax returns.

The subject matter of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Operational Environment for Embodiments of The Invention

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, via which other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also, on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media and may be internally installed in computer 102 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the Institute of Electrical and Electronics Engineers (IEEE) 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over public Internet 132. Local network 126 is in turn connected to public Internet 132, which connects many networks such as local network 126, remote network 134 or directly attached computers such as computer 136. In some embodiments, computer 102 can itself be directly connected to public Internet 132.

Figure 2A:
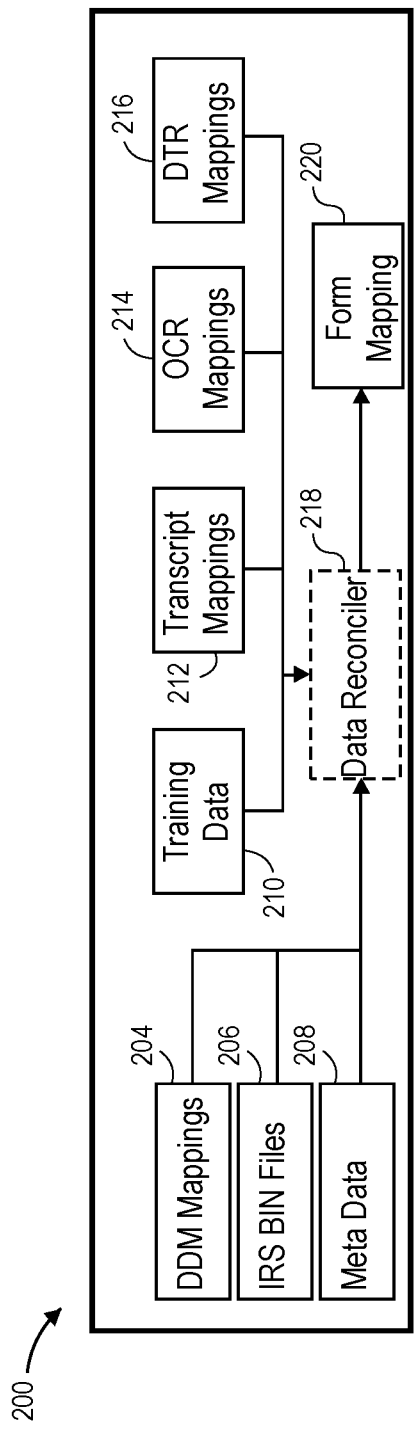
FIG. 2A depicts components of a system for generating form frames that are responsible for computer-automated creation and updating of data form normalization mappings in embodiments of the invention.

Turning now to FIG. 2A, components of system 200 are depicted for computer-automated creation and updating of data form normalization mappings in embodiments of the invention. System 200 incorporates various data sources to ultimately produce form mapping 220 which can be used to make predictions of mappings from fields in various input documents to a set of standard normalized field values. Domain Data Model (DDM) mappings 204, IRS background information note (BIN) files 206, and tax-related metadata 208 are provided as inputs to data reconciler 218. In these embodiments DDM mappings, BIN files, and other tax-related metadata are regulatory agency data sources that provide information regarding tax return preparation. In addition to receiving metadata from these data sources, data reconciler 218 also receives information from training data 210. Training data 210 may include simulated data sources having known values based on real-world input sources received from various cohorts of taxpayers having known sources of input forms. Additionally, transcript mappings 212 provide a source of information to data reconciler 218 in the form of known values of variable names provided in IRS transcripts of tax returns and how the known variable names correspond to standard normalized field values.

Similarly, OCR mappings 214 are provided that include known values of variable names provided in real-world, processed OCR input forms and how the OCR-processed variable names correspond to standard normalized field values. In some embodiments Digital Tax Reporting (DTR) mappings 216 are provided to provide a source of context to data reconciler 218 in the form of known values of variable names provided in DTR input and how the corresponding variable names map to standard normalized field values. Given these source inputs, data reconciler 218 produces form mapping 220. In various embodiments, data reconciler 218 performs a series of joins to provide a name for each of the tax return lines in a particular training set. In some embodiments, a default name is first assumed according to a standard formatting. However in a case where a standard assumed name is absent, other data sources are employed. Data reconciler 218 is used in the normalization process as further described below in connection with FIG. 2B. In various embodiments, data reconciler 218 combines the above-described metadata (sources 204-206 and 210-216) to create form mapping 220. In these embodiments, form mapping may be stored as a spreadsheet which describes how the various above-described data sources map to standard normalized field values. In some embodiments, the metadata sources described above may be obtained through APIs, and well as mappings provided by owners of the various sources of data (e.g., mappings of IRS transcript line names to DDM). In some such embodiments, past tax years are processed sequentially to reflect differences in historic variable naming and/or value formatting, and then all years are combined into a single file for use in production.

Figure 2B:
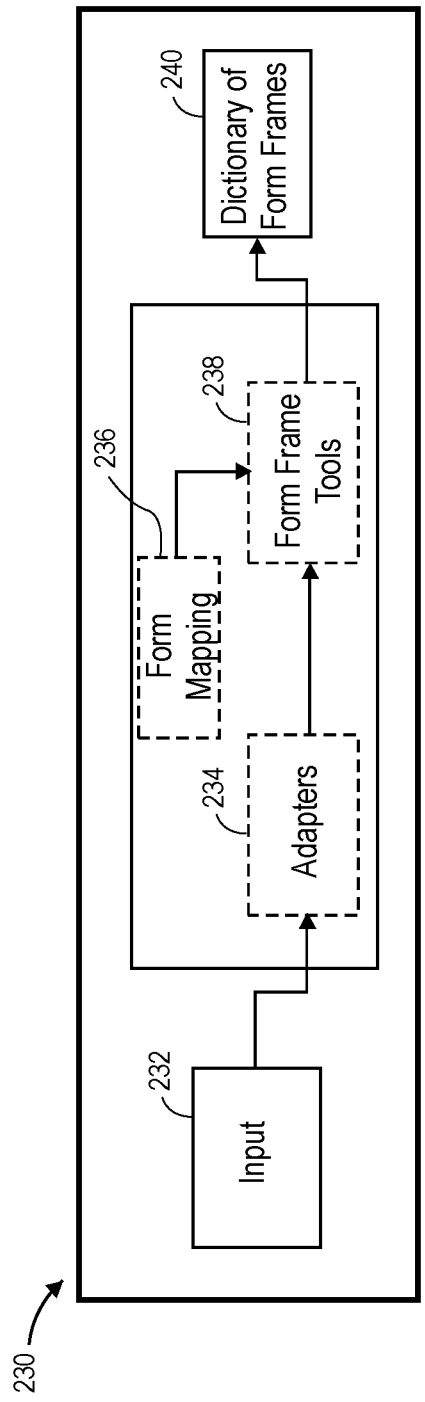
FIG. 2B depicts components of a system for automatically generating form frames that are responsible for carrying out data parsing and standardization in connection with the data form normalization mappings in embodiments of the invention.

Turning now to FIG. 2B, components of system 230 are depicted for generating form frames that are responsible for carrying out data parsing and standardization in connection with the data form normalization mappings in embodiments of the invention. In various embodiments, system 230 provides preprocessing functionality of data parsing and standardization of data field names and formatting of values. Typical sources of taxpayer electronic input documents frequently have varying data field or variable names corresponding to a particular input value as well as varying rules regarding a position of a particular data field within particular rows and columns of a data table containing taxpayer information.

In some embodiments, a systematic means is provided to standardize a taxpayer's input data so that arbitrary sources of taxpayer information can be fed into models for training and scoring consistent with the present teachings. After normalization by exemplary system 230, regardless of the input source, a standardized name and data format will be achieved for a particular variable. For example, regardless of whether a particular input source originates in the form of various versions of Internal Revenue System (IRS) transcripts, various HyperText Markup Language (HTML) sources, optical character recognition (OCR) of paper or electronic forms, etc., a form W2 line 4 will be the same in the normalized output. System 230 performs this normalization as further explained below using metadata obtained from prior tax returns, IRS data sources, and by processing the forms according to embodiments of the invention.

In various embodiments, incoming data forms taking the structure of input 232 are received by system 230. Next, adapters 234 process field values from input 232. Adapters 234 are a collection of functions for manipulating incoming data (.html, .json, etc.) to a data frame, which is a N×T table where N is the number of instances of a tax form and T is the number of lines on that form. Each row represents and individual form, so taxpayers having multiple W2s will have multiple rows in such a table. Adapters read various data sources and apply a series of manipulations to transform data in the aforementioned data frame into a table having appropriate column names. In parallel form mapping 236, which was derived as described above in FIG. 2A, provides input to form frame tools 238, which themselves also receive preprocessed input from adapters 234. Form frame tools 238 are a collection of functions used to standardize input 232 based on instructions contained in form mapping 236. In some embodiments, the instructions correspond to names to be applied to each column, and any corresponding necessary text transformation that needs to be performed. In some embodiments, such a text transformation may be specified in the form of a regular expression. In some embodiments, the instructions map one or more tax form input line names to a corresponding desired output tax form line name. Finally, dictionary of form frames 240 is produced, which has a structure in which keys are individual tax forms and each dictionary entry contains a form frame corresponding to that particular tax form.

Figure 3:
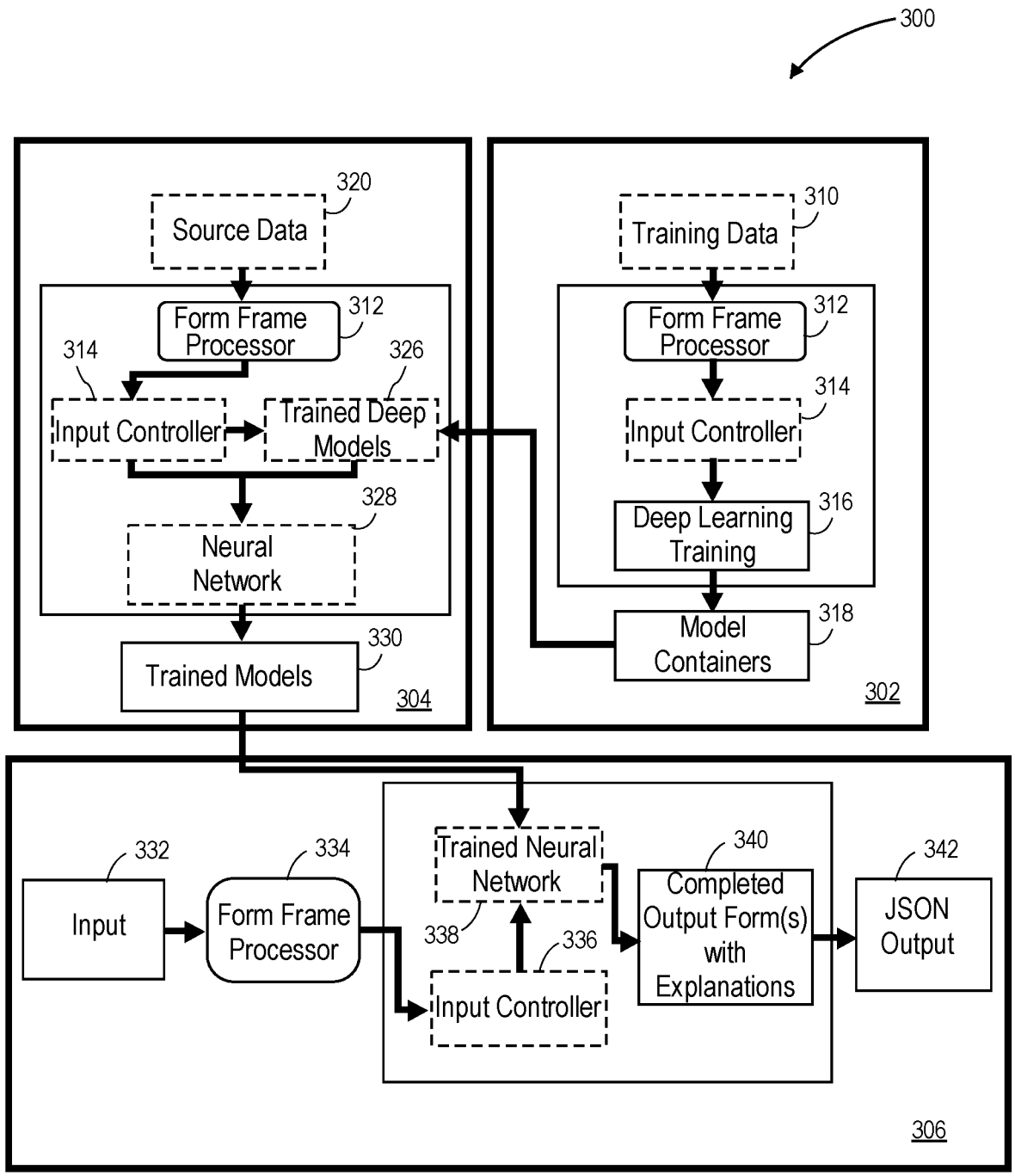
FIG. 3 depicts components of a system for carrying out deep learning training and execution in embodiments of the invention.

Turning now to FIG. 3, components of system 300 are depicted for carrying out deep learning training and execution in embodiments of the invention. In various embodiments, in order to carry out deep learning training, deep learning training module 302 is employed. In these embodiments, training data 310 is received and processed in connection with form frame processor 312 as described in more detail in connection with FIGS. 2A and 2B above. In various embodiments, input controller 314 provides a set of functions responsible for determining the order in which output forms are completed. Input controller 314 also determines what information should be available, with which information each line is computed (e.g., when filling out line 1, lines 2 and 3 are not known or when line 2 is filled out, line 1 is known but line 3 is not, etc.). Deep learning training occurs at box 316. In some embodiments, this deep learning training involves automatically applying and/or evaluating various models, including custom developed models coded, for example, by subject matter experts who contribute models by developing code that receives input source data, optionally passes it through standardization and/or normalization process and then through input controller 314 to generate a list of output forms and lines requiring associated calculation predictions. In various embodiments, a modeler is then responsible for producing a script to build a series of machine learning models that predict output form line names with corresponding accuracy being evaluated and ranked, irrespective of individual model performance metrics with respect to arbitrary inputs and outputs. In these embodiments, resulting deep learning trained models are cataloged and stored in model containers 318 which are made available to neural network training module 304. In some embodiments, modelers are subject matter experts or software developers who create various scripts in various ways such as by developing scripts in scripting languages employing machine learning libraries or other techniques.

In some embodiments, neural network training module 304 receives access to model containers 318 to augment further training based on source data 320. In these embodiments, source data 320 is received and normalized by form frame processor 312 as described in more detail in connection with FIGS. 2A and 2B above. In various embodiments, input controller 314 provides a set of functions responsible for determining an order in which output forms line values are computed. Input controller 314 also determines what information should be available, with which information each line is computed.

In neural network training module 304, input controller 314 provides output in parallel to trained deep models 326 as well as to neural network 328. Similarly trained deep models provide a parallel input to neural network 328. As a result of input controller 314 output as well as outputs from trained deep models 326, neural network 328 is trained and cataloged for future application in trained models 330, which themselves are provided as input to a production flow module 306.

In various embodiments, production flow module 306 receives input 332 in the form of input form data which are then pre-processed and normalized in connection with form frame processor 334. The resulting data frame output from form frame processor 334 is then routed to input controller 336, which itself determines what information should be available in connection with corresponding tax forms as well as dependencies between lines within the forms and a corresponding order of computation. From input controller 336, outputs are provided in corresponding assigned order and routed to trained neural network 338, which itself produces completed output forms with explanations 340. In some embodiments, these forms and explanations are formatted as JSON Output 342 and returned as an API response if, for example, system 300 is invoked in a backend system as a part of an API call, for example. In these embodiments, the natural language explanations are based on associations derived from the training of the neural network 338 based on accuracy of predictions as evaluated during training.

Figure 4:
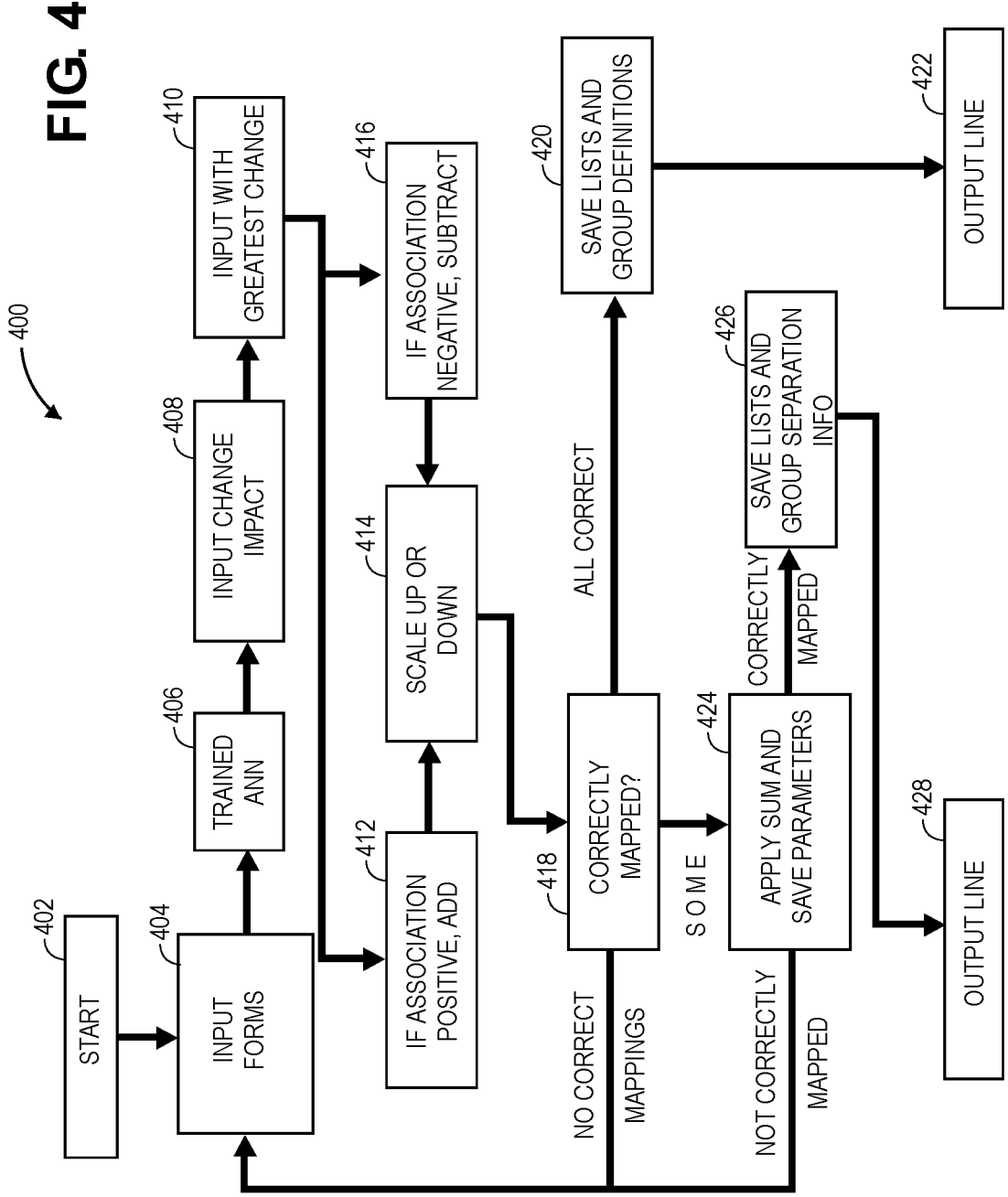
FIG. 4 depicts components of a system for carrying out artificial neural network application in embodiments of the invention.

Turning now to FIG. 4, components of system 400 are depicted for carrying out artificial neural network application in embodiments of the invention. Custom application of reinforcement learning which uses data from completed tax returns, as well as deep learning models trained on them, and used to build a series of rules that when applied to a set of tax inputs (e.g., W2, 1099int) provide instructions for how to complete output forms. Source data is passed through a normalization process then to an input controller which determines an order in which calculations should be performed. The trained deep learning models are also provided to help an associated neural network training module select an appropriate trained model based on plausible relationships between inputs and outputs. As explained below, by selecting models based on variations in outputs in response to input changes, an optimal model may be selected much more quickly (on average) than a brute-force, random search for optimal models in which models are selected in order, applied and ranked based on accuracy.

In these embodiments, neural network training starts at box 402. In some embodiments, system 400 is intended to iterate a predetermined number of times or until all inputs are found to be accurately mapped to corresponding accurate output calculations. Next, input forms 404 are accessed and associated information routed to trained artificial neural network (ANN) 406, which has previously been trained to predict an output based on particular input values. In some embodiments, to perturb the system and to facilitate training, input forms are processed with inputs increased or decreased in order to evaluate changes on input-to-output mappings based on corresponding simulated input variances. Next, at box 408, an input change impact is evaluated by applying varying inputs to trained ANN 406 to determine which input results in a greatest overall change in the expected output line (box 410). In various embodiments, input change impact 408 is a rank-ordered list of input change impact on a particular expected output line. From here, in parallel results are routed to a determination regarding whether input variance is positive (box 412) or negative (box 416). In either case, at box 414 a corresponding impact score is scaled up or down accordingly. In some embodiments, this is performed by scaling the proportion of the output value being added or subtracted to determine whether a percentage of the values need to be added or subtracted. In some embodiments, it may be determined that a substantially linear relationship exists between the expected and actual target calculated form line. In such cases, corresponding values may be determined to be within a fixed magnitude higher or lower, thereby triggering determination and application of a corresponding scaling factor.

From here, a determination is made at box 418 regarding whether inputs and outputs are mapped correctly based on an applied ANN to produce accurately computed output tax form lines. If, as determined at box 418, none of the lines are correctly mapped, results are routed back to input forms 404 for further neutral network training and selection. If all of the mappings are correct, outputs are routed to box 420, where lists of mappings and group definitions associated with the trained ANN are saved and a corresponding output line 422 is provided as a result.

Mapping correctness may be validated as follows. In some embodiments, a set of hold-out validation tax returns are evaluated and selected for use for machine-learning model validation. In these embodiments input forms and associated lines are evaluated to determine how accurately an application of a particular mapping completes the returns. The result is a determination of both accuracy in what the client owes as well as how often all output form lines are exactly right. In some embodiments, such hold-out data, which has been determined to be correct by experienced subject matter experts and which was accepted by the IRS as correct and complete is not used for model training but only for verification. Once models are trained using a broad spectrum of data, the models are validated by testing the generated outputs on corresponding hold-out data set(s).

If, alternatively, only some of the outputs are correctly mapped, outputs are routed to box 424 where a support vector machine (SVM) is applied to find a best possible separation between cases that are correctly mapped and those that are not, while saving associated hyperplane parameters. In some embodiments, hyperplane parameters provide an indication regarding where in a space of relevant inputs groups should be separated out based solely on input variables. Using multiple planes, hyperplane parameters may be used to inform groupings of correct and incorrect outputs. This classification and an associated determination regarding whether such classification is correct or incorrect is used to improve machine-learning models.

From here any, remaining incorrectly mapped inputs are routed for further processing, and correctly mapped outputs are routed to box 422, at which point associated lists and group separation information is saved. At box 428 associated an associated accurately calculated output line 428 is provided as a result.

Figure 5:
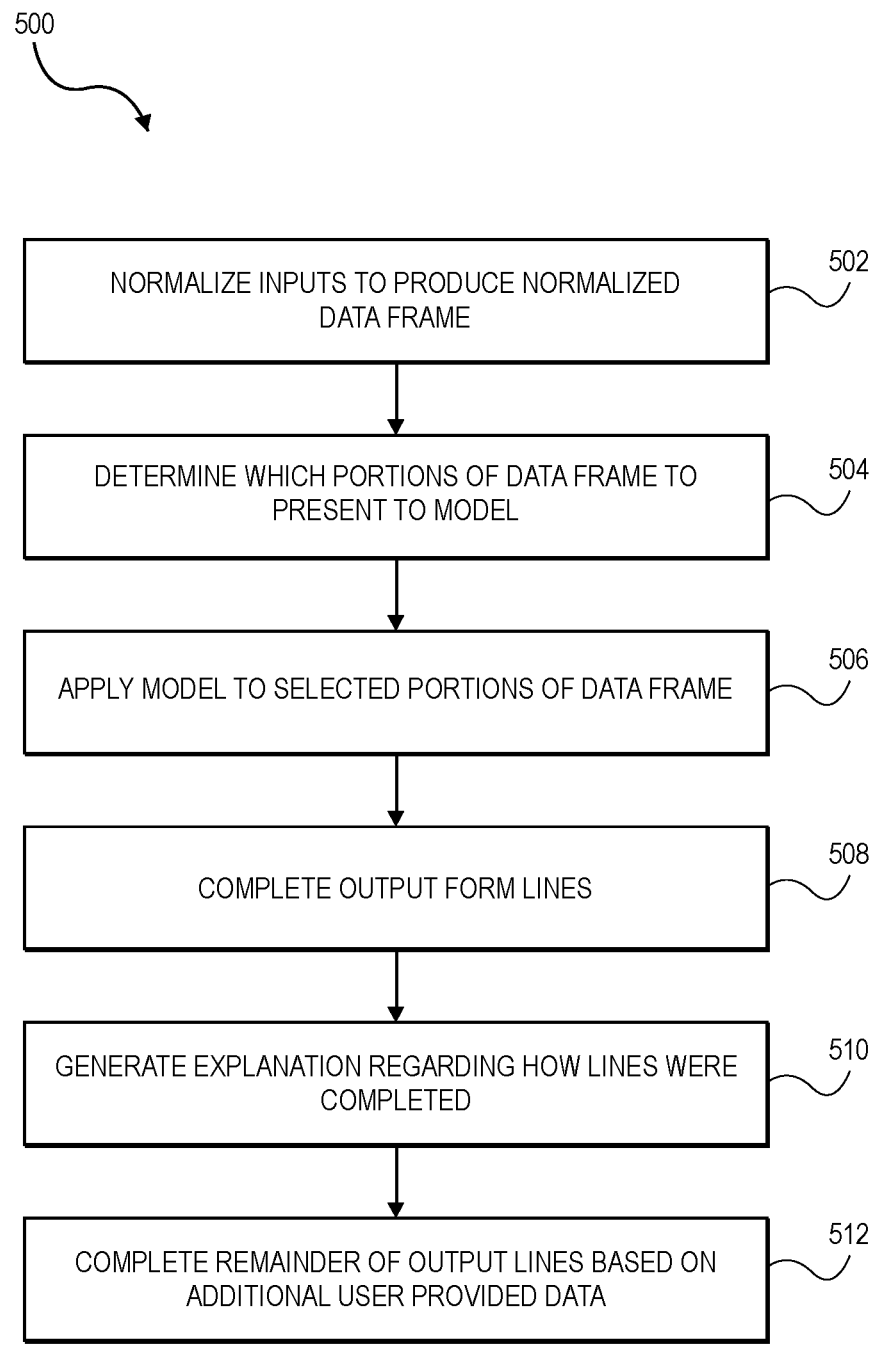
FIG. 5 depicts an exemplary flow chart for illustrating the operation of a method in accordance with various embodiments of the invention.

Turning now to FIG. 5, an exemplary flow chart 500 is depicted for illustrating the operation of a method in accordance with various embodiments of the invention. Initially at step 502, inputs are normalized to produce a normalized data frame. In some embodiments, this involves receiving data associated with a tax-related input forms having a plurality of input form field values, which themselves are automatically parsed into a set of computer-generated candidate standard field values. Next the set of candidate standard field values are automatically normalized into one or more data frames having a corresponding set of normalized field values, based on a computer-automated input normalization model.

Next at step 504, it is determined which portions of the data frame to apply to a line calculation neural network. Based on this determination a line calculation neural network is applied to the data frame (step 506). In some embodiments, at least one output form line calculation is performed and at step 508, any computed output form lines that can be computed are completed. Next, at step 510, a natural language explanation is generated regarding the at least one output form line calculation. In these embodiments, if additional taxpayer input is required, one or more additional user provided inputs is provided by the taxpayer or other user, in response to the natural language explanation. Finally, at step 512, the remainder of tax form output lines are completed based on the additionally provided user information.

In some embodiments, in response to determining an order in which output forms should be completed, a list of output lines requiring predictions is generated, and based on the calculation neural network, a corresponding set of machine learning models is selected to predict calculated values corresponding to the determined list of output lines. In some embodiments, the line calculation neural network is selected based on one or more trained deep models, which scripts import training data, pass it to a form frame, generate features, and then train ANN models. In various embodiments, the models may be either ipynb or .py files. In these embodiments, the corresponding set of machine learning models is constructed in connection with a model-builder script. In some embodiments, performing at least one output form line calculation involves mapping inputs to outputs based on an impact associated on a change in one or more input values. In these embodiments, the change in the one or more input values corresponds to a greatest change in one or more corresponding outputs. In various embodiments, the natural language explanation is modeled based on selection of the line calculation neural network.

In various embodiments, an intelligent tax return review system provided. Such a tax return review embodiment builds on tax return transcript review systems by adding capabilities to estimate an amount of financial impact on a particular taxpayer's refund amount if potential errors were corrected and an amended return filed. Completed tax forms (or transcripts) may be evaluated by a return evaluation system, and if an error is detected, the return evaluation system identifies a set of inputs that have been identified as having been mapped to a set of anomalous outputs to automate calculation of a corrected return, systems consistent with the present teachings then provide a predicted calculation regarding an expected change in the taxpayer's refund (or tax liability).

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. One or more non-transitory computer-readable media storing computer-executable instructions that, when executed by a processor, perform a method for automated calculation of predicted values using deep learning models, the method comprising:
   receiving one or more input forms, each of the one or more input forms comprising a plurality of input form field values;
   automatically parsing the plurality of input form field values into a set of computer-generated candidate standard field values;
   automatically normalizing the set of computer-generated candidate standard field values into a data frame comprising a corresponding set of normalized field values, based on a computer-automated input normalization model;
   in response to determining which portions of the data frame to apply to a line calculation neural network, applying the line calculation neural network;

performing at least one output form line calculation;

generating a natural language explanation regarding the at least one output form line calculation, the natural language explanation based on the line calculation neural network;

receiving, from a user, one or more additional user-provided inputs in response to the natural language explanation;

calculating at least one remaining calculation based on the one or more additional user provided inputs;

in response to determining an order in which output forms should be completed, generating a list of output lines requiring predictions; and based on the line calculation neural network, selecting corresponding set of machine learning models to predict calculated values corresponding to the list of output lines.

2. The non-transitory computer-readable media of claim 1, wherein the line calculation neural network is selected based on one or more trained deep models.

3. The non-transitory computer-readable media of claim 1, wherein the corresponding set of machine learning models is constructed in connection with a model-builder script.

4. The non-transitory computer-readable media of claim 2, wherein the one or more trained deep models: script import training data, passes import training data to a form frame, generates features, and trains artificial neural network models.

5. The non-transitory computer-readable media of claim 1, wherein performing the at least one output form line calculation comprises:

mapping inputs to outputs based on an impact associated on a change in one or more input values.

6. The non-transitory computer-readable media of claim 5, the change in the one or more input values corresponds to a greatest change in one or more corresponding outputs.

7. The non-transitory computer-readable media of claim 1, wherein the natural language explanation is modeled based on selection of the line calculation neural network.

8. A method for automated calculation of predicted values using deep learning models, the method comprising:

receiving one or more input forms, each of the one or more input forms comprising a plurality of input form field values;

automatically parsing the plurality of input form field values into a set of computer-generated candidate standard field values;

automatically normalizing the set of computer-generated candidate standard field values into a data frame comprising a corresponding set of normalized field values, based on a computer-automated input normalization model;

in response to determining which portions of the data frame to apply to a line calculation neural network, applying the line calculation neural network;

performing at least one output form line calculation;

generating a natural language explanation regarding the at least one output form line calculation, the natural language explanation based on the line calculation neural network;

receiving, from a user, one or more additional user-provided inputs in response to the natural language explanation;

calculating at least one remaining calculation based on the one or more additional user provided inputs;

in response to determining an order in which output forms should be completed, generating a list of output lines requiring predictions; and based on the line calculation neural network, selecting corresponding set of machine learning models to predict calculated values corresponding to the list of output lines.

9. The method of claim 8, wherein the line calculation neural network is selected based on one or more trained deep models.

10. The method of claim 9, wherein the one or more trained deep models: script import training data, passes import training data to a form frame, generates features, and trains artificial neural network models.

11. The method of claim 8, wherein the corresponding set of machine learning models is constructed in connection with a model-builder script.

12. The method of claim 8, wherein performing the at least one output form line calculation comprises:

mapping inputs to outputs based on an impact associated on a change in one or more input values.

13. The method of claim 12, wherein the change in the one or more input values corresponds to a greatest change in one or more corresponding outputs.

14. The method of claim 8, wherein the natural language explanation is modeled based on selection of the line calculation neural network.

15. A system comprising at least one processor and at least one non-transitory memory storing computer executable instructions that when executed by the at least one processor cause the system to carry out actions comprising:

receiving one or more input forms, each of the one or more input forms comprising a plurality of input form field values;

automatically parsing the plurality of input form field values into a set of computer-generated candidate standard field values;

automatically normalizing the set of computer-generated candidate standard field values into a data frame comprising a corresponding set of normalized field values, based on a computer-automated input normalization model;

in response to determining which portions of the data frame to apply to a line calculation neural network, applying the line calculation neural network;

performing at least one output form line calculation;

generating a natural language explanation regarding the at least one output form line calculation, the natural language explanation based on the line calculation neural network;

receiving, from a user, one or more additional user-provided inputs in response to the natural language explanation;

calculating at least one remaining calculation based on the one or more additional user provided inputs;

in response to determining an order in which output forms should be completed, generating a list of output lines requiring predictions; and based on the line calculation neural network, selecting corresponding set of machine learning models to predict calculated values corresponding to the list of output lines.

16. The system of claim 15, wherein the line calculation neural network is selected based on one or more trained deep models.

17. The system of claim 16, wherein the one or more trained deep models: script import training data, passes import training data to a form frame, generates features, and trains artificial neural network models.

18. The system of claim 15, wherein the corresponding set of machine learning models is constructed in connection with a model-builder script.

19. The system of claim 15, wherein a change in at least one input form field value of the plurality of input form field values corresponds to a greatest change in one or more corresponding outputs.

20. The system of claim 15, wherein the natural language explanation is modeled based on selection of the line calculation neural network.

* * * * *